Nov. 2, 1954 C. W. SINCLAIR ET AL 2,693,021
METHOD OF MAKING FRICTION BAND ASSEMBLIES
Filed Dec. 20, 1950 3 Sheets-Sheet 1

INVENTORS
CHARLES W. SINCLAIR
BY HARRY A. PALMER

ATTORNEYS

INVENTORS
CHARLES W. SINCLAIR
HARRY A. PALMER
BY
ATTORNEYS

Nov. 2, 1954  C. W. SINCLAIR ET AL  2,693,021
METHOD OF MAKING FRICTION BAND ASSEMBLIES
Filed Dec. 20, 1950  3 Sheets-Sheet 3
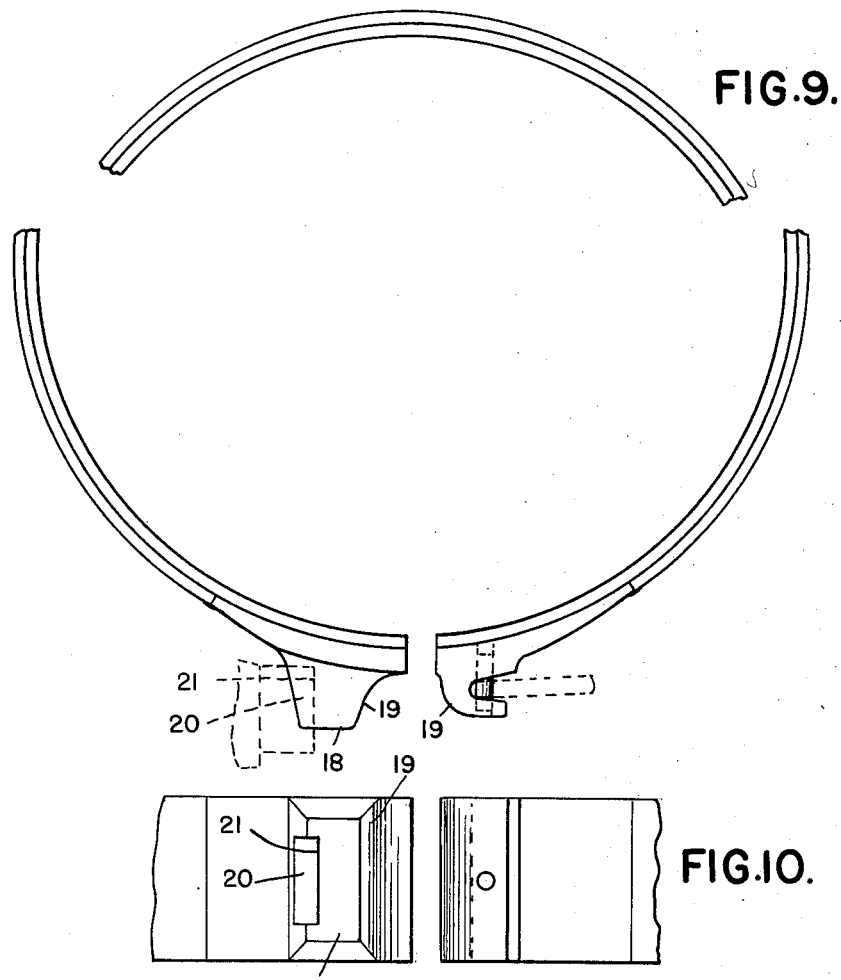
FIG.9.
FIG.10.
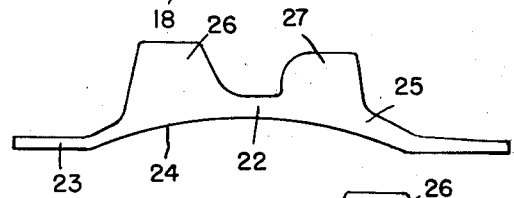
FIG.11.
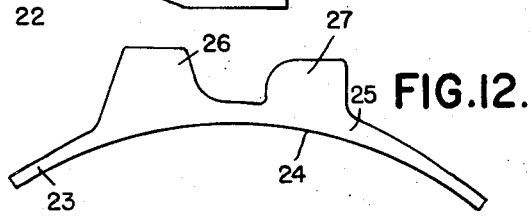
FIG.12.
FIG.13.
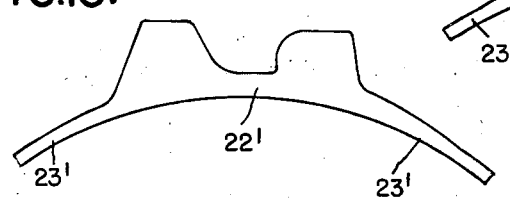
INVENTORS
CHARLES W. SINCLAIR
BY HARRY A. PALMER
ATTORNEYS

United States Patent Office 2,693,021
Patented Nov. 2, 1954

2,693,021

METHOD OF MAKING FRICTION BAND ASSEMBLIES

Charles W. Sinclair, Detroit, and Harry A. Palmer, Birmingham, Mich., assignors to Kelsey-Hayes Wheel Company, Detroit, Mich., a corporation of Michigan Application December 20, 1950, Serial No. 201,762

5 Claims. (Cl. 29—152.1)

The invention relates to the manufacture of friction band assemblies and refers more particularly to friction band assemblies for use in transmission for holding the parts of the transmission from rotation.

The invention has for one of its objects to provide an improved method of making a friction band assembly by employing simple, economical steps to reduce the cost of manufacture, and at the same time form a strong substantial construction of friction band assembly capable of readily withstanding the stresses to which it may be subjected in operation.

This and other objects of the invention will become apparent from the following description taken in connection with the accompanying drawings in which:

Figures 9 and 10 are views respective similar to Figures 1 and 2 showing a modified construction of friction band assembly made in accordance with the method embodying the invention;

Figure 3:
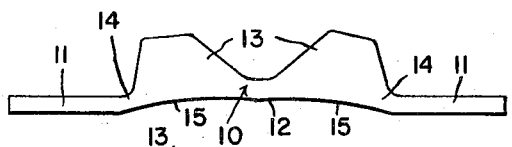
Figure 3 is an edge elevation of a part of the friction band assembly as initially made.
Figure 5:
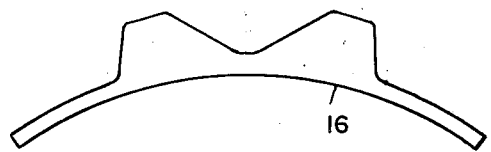
Figure 5 is a view similar to Figure 3 showing the part after it has been refashioned.

Figures 11 and 12 are views similar to Figures 3 and 5 showing successive stages in the manufacture of one of the parts of the friction band assembly of Figures 9 and 10; and Figure 13 is a view similar to Figure 11 showing the same part as initially made by a modified step.

Figure 1:
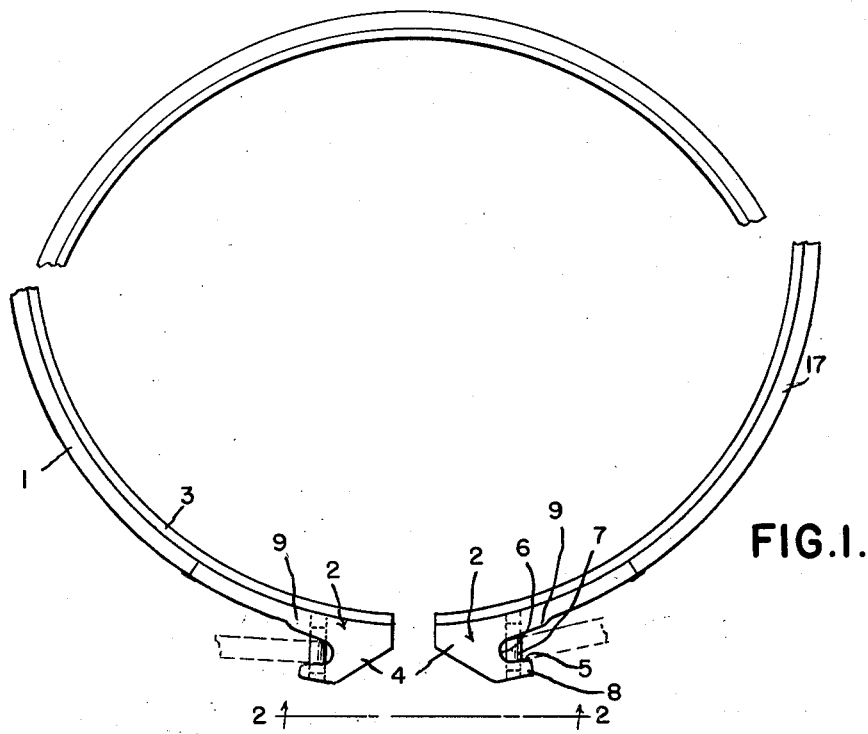
Figure 1 is an edge elevation of a friction band assembly made in accordance with the method embodying the invention.
Figure 2:
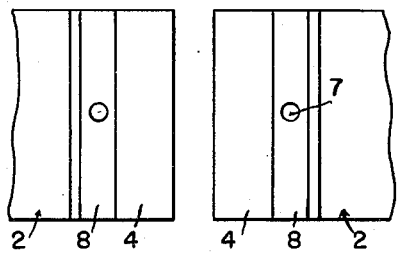
Figure 2 is a cross section on the line 2—2 of Figure 1.

The friction band assembly, illustrated in Figures 1 and 2 and manufactured in accordance with the method embodying the invention, comprises the sheet steel band 1, the end pieces 2 at the ends of the band and spaced peripherally from each other, and the internal lining 3 extending around and secured to the inner faces of the band and end pieces. Each end piece has the generally radially outwardly extending projection 4 which is formed with the recess 5 extending parallel to the axis of the assembly and providing the concave abutment surface 6 engageable with a strut of the transmission for which the assembly is designed. A strut positioning pin 7 extends through the outer overhanging portion 8 and the inner portion 9 of the end piece formed by the recess 5, this pin being substantially parallel to the radius of the assembly which passes midway between the end pieces.

Figure 4:
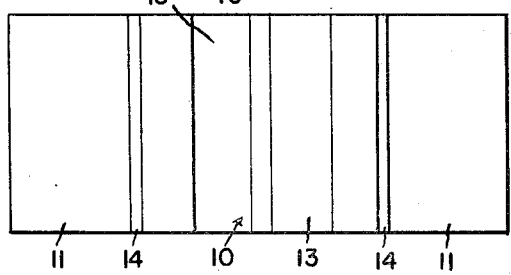
Figure 4 is a plan view thereof.

In the manufacture of the friction band assembly, the end pieces as shown particularly in Figures 3 and 4 are formed as a unit or in one piece by forging a metal piece into a blank having the intermediate portion 10 and the lateral extensions 11 at the opposite ends of the intermediate portion. The intermediate portion is formed with the generally concave side 12, the longitudinally spaced projections 13 on the convex side and the end parts 14 beyond the projections and connecting into the extensions. The generally concave side has the concave faces 15 of preferably the same radius occupying different longitudinal parts of the concave side and in the present instance these concave faces are in end to end relation. Furthermore, the concave faces extend along the end parts 14 and terminate at the extensions 11. The extensions are coplanar.

The forged blank of Figures 3 and 4 is refashioned by a pressing and more particularly a coining step which fashions the intermediate portion 10 and the extensions 11 to form the blank illustrated in Figure 5, the intermediate portion being curved and the extensions being curved into arcuate shape and in continuation of the end parts of the intermediate portion to form the arcuate concave face 16 of substantially the same radius throughout the length of the blank or from the outer end of one extension to the outer end of the other extension. During the refashioning step the outer ends of the extensions are cut to provide a predetermined length of blank providing predetermined excess lengths of metal at the outer ends of the extensions to be removed in the butt welding operation later referred to.

Figure 6:
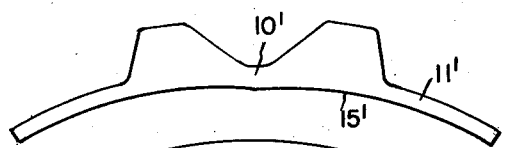
Figure 6 is a view similar to Figure 3 showing the same part as initially made by a modified step.

Instead of forming the forged blank of Figure 3, the forged blank illustrated in Figure 6 may be formed by a modified step producing the arcuate extensions 11' at the opposite ends of the intermediate portion 10', the latter being the same as the intermediate portion 10 of Figure 3. The concave faces of the arcuate extensions 11' are preferably of the same radius as that of the concave faces 15' and are in continuation thereof.

The forged blank of Figure 6 is refashioned by a pressing and more particularly a coining step to produce the blank illustrated in Figure 5.

Figure 7:
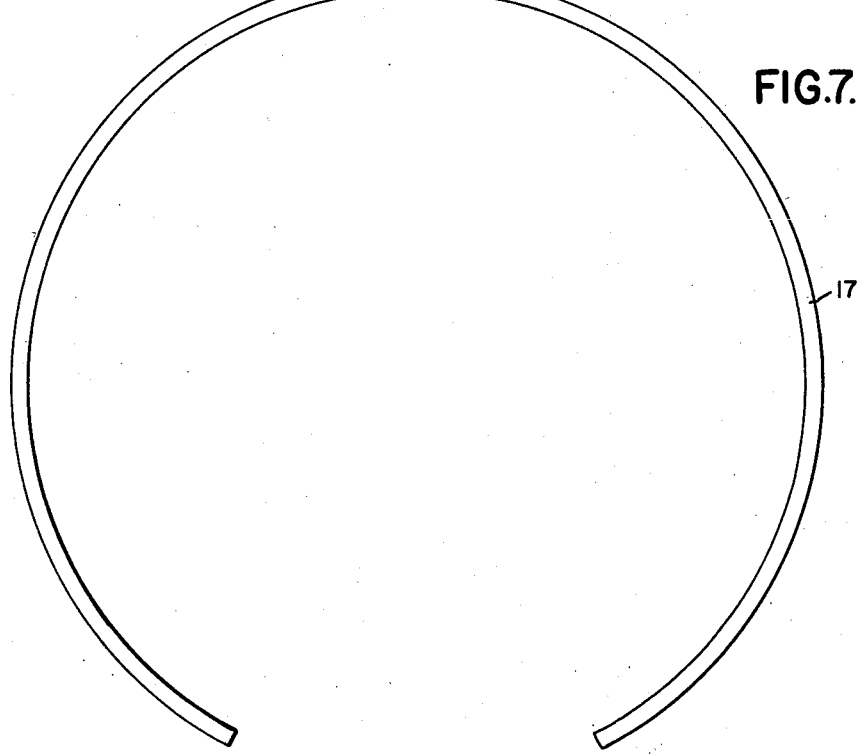
Figure 7 is an edge elevation of another part of the friction band assembly.

The transversely split substantially cylindrical band 17 illustrated in Figure 7 is also formed, this band having substantially the same radius as that of the arcuate concave face 16 throughout its peripheral extent and having a predetermined peripheral length providing excess material at its ends to be removed during the following butt welding operation.

The next step consists in butt welding the outer ends of the extensions to the ends of the band during which time the excess material at the ends of the extensions and band is removed. The butt welding may be accomplished by welding both ends to the band to the ends of the extensions at the same time or by successively welding one end of the band to the end of one extension and the other end of the band to the end of the other extension.

After the butt welding step, the steps of trimming both weld flashes and particularly their radially inner portions, heat treating the assembly, sizing the assembly by expansion and trimming the edges of the assembly, are carried out. Then the holes for receiving the pins 7 are drilled in the forging, after which the portions of the projections 13 facing away from each other are formed with the recesses 5 by broaching. The pins are then inserted into the holes and secured in place by peening over the metal ends of the holes.

Figure 8:
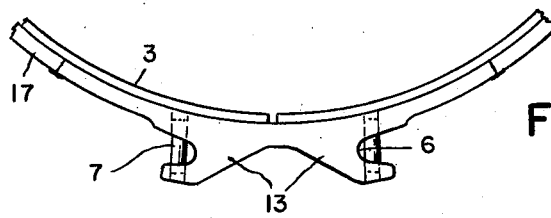
Figure 8 is an edge elevation showing the two parts after they have been welded together.

The next step consists in shot blasting the assembly, after which the lining 3 is bonded to the inside of the band and the forging by spraying a suitable cement, such as Cycleweld Cement, on the inside of the assembly, inserting the lining, and oven drying, the resulting product being shown in Figure 8.

After the bonding of the lining to the inside of the assembly, the assembly is transversely split by transversely severing the forging between its projections. The severing is preferably accomplished by a broach or a milling cutter, the width of either of which is the width of the gap between the two end pieces resulting from the severing step. During the severing of the forging the lining is also cut to have the same gap between its ends.

The burrs are then removed and the steps of straightening the assembly so that each of its edges will be in a plane and rounding the assembly are carried out if these steps are found necessary, the final structure being that illustrated in Figures 1 and 2.

The friction band assembly illustrated in Figures 9 and 10 is of the same general construction as that illustrated in Figures 1 and 2 but differs essentially in forming the projection 18 of one end piece 19 with the recess 20 in its portion facing away from the gap between this end piece and the other end piece, the recess providing the abutment surface 21 substantially parallel to the radius of the assembly passing through the inner end of the end piece 19 and engageable with the head of a screw of the transmission for which the assembly is designed.

In the manufacture of the friction band assembly of Figures 9 and 10, the end piece 19 and also the other end piece as shown in Figure 11 are formed as a unit or in one piece by forging a metal piece into a blank having the intermediate portion 22 and the lateral coplanar extensions 23 at the opposite ends of the intermediate portion. The intermediate portion has the concave face 24 of the same radius from end to end of the intermediate portion which includes the end parts 25. The intermediate portion also has the longitudinally spaced projections 26 and 27 on the convex side, the projection 26 being of greater length than the projection 27.

The forged blank of Figure 11 is refashioned by pressing and more particularly coining the same to form the blank illustrated in Figure 12, the extensions 23 being curved into arcuate shape and in continuation of the end parts 25 with their concave faces in continuation of the concave face 24 and in the same radius. During the refashioning the outer ends of the extensions are cut to provide predetermined excess lengths of metal at the outer ends of the extensions to be removed in the butt welding operation for securing the ends of the band to the ends of the extensions.

Instead of forming the forged blank of Figure 11, the forged blank of Figure 13 may be formed by a modified step producing the arcuate extensions 23' at the opposite ends of the intermediate portion 22', the latter being the same as the intermediate portion 22 of Figure 11. The concave faces of the arcuate extensions are preferably of the same radius as that of the concave face 24 and have the same center or axis.

The forged blank of Figure 13 is refashioned by a pressing and more particularly a coining step to produce the blank of Figure 12.

The band of the assembly is formed in the same manner as the band of Figures 1 and 2 and the butt welding of the band to the refashioned forged blank is also carried out in the same manner. Also the same steps of trimming the weld flashes, heat treating the assembly, sizing the assembly and trimming the edges of the assembly are performed after which the portion of the projection 26 facing away from the other projection 27 is formed with the recess 20 by broaching and the other projection 27 is operated upon in the same manner as the projections of Figures 1 and 2 by drilling a hole for receiving the positioning pin and broaching the portion of the projection 27 facing away from the projection 26 to form a recess providing a concave abutment surface for engagement with a strut. Also a positioning pin is inserted into the hole and secured in place by peening over the metal at the ends of the hole.

The succeeding steps including the bonding of the lining to the inside of the band and the forging and the severing of the forging between the projections 26 and 27 are preferably the same as those carried out in producing the friction band assembly of Figures 1 and 2.

What I claim as my invention is:

1. The method of making a friction band assembly which comprises forming a forging having a concave inner surface and having a pair of longitudinally spaced projections extending outwardly from the outer surface of the forging, forming a transversely split cylindrical band, welding the ends of the forging to the ends of the band in abutting end-to-end relation with the inner surface of the forging in continuation of the inner surface of the band to provide a forging and band assembly, then sizing the latter assembly by expansion, securing a lining to the inner surfaces of the forging and band, and thereafter transversely severing the forging and the lining intermediate the projections.

2. The method of making a friction band assembly which comprises forming a forging, forming a transversely split cylindrical band, securing the forging to the ends of the band with the forging disposed on the radially outer side of a circle coincident with the inner surface of the band to provide a forging and band assembly, then sizing the latter assembly by expansion, securing a lining to the inner surfaces of the forging and band, and thereafter transversely severing the forging intermediate its ends.

3. The method of making a friction band assembly which comprises forming a forging having a concave inner surface and having a pair of longitudinally spaced projections extending outwardly from the outer surface of the forging, forming a transversely split cylindrical band, welding the ends of the forging to the ends of the band in abutting end-to-end relation with the inner surface of the forging in continuation of the inner surface of the band, securing a lining to the inner surfaces of the forging and band, and then transversely severing the forging intermediate the projections.

4. The method set forth in claim 3, in which the lining at the severed portion of the forging is also severed during the severing of the forging.

5. The method of making a friction band assembly which comprises forming a forging having a concave inner surface, forming a transversely split cylindrical band, securing the ends of the forging to the ends of the band in abutting end-to-end relation with the inner surface of the forging in continuation of the inner surface of the band, securing a lining to the inner surfaces of the forging and band, and then transversely severing the forging intermediate its ends.

References Cited in the file of this patent

UNITED STATES PATENTS

| Number | Name | Date |
|---|---|---|
| 635,288 | Barrett | Oct. 24, 1899 |
| 1,629,427 | Whitworth | May 17, 1927 |
| 1,706,635 | Smith | Mar. 26, 1929 |
| 1,875,081 | McConkey | Aug. 30, 1932 |
| 1,894,321 | Nelson | Jan. 17, 1933 |
| 2,112,697 | Van Halteren | Mar. 29, 1938 |
| 2,294,466 | Le Jeune | Sept. 1, 1942 |